United States Patent
Cukrov

(10) Patent No.: US 10,701,895 B1
(45) Date of Patent: Jul. 7, 2020

(54) THERAPEUTIC UNIT FOR PETS

(71) Applicant: Linda Cukrov, San Pedro, CA (US)

(72) Inventor: Linda Cukrov, San Pedro, CA (US)

(*) Notice: Subject to any disclaimer, the term of this patent is extended or adjusted under 35 U.S.C. 154(b) by 211 days.

(21) Appl. No.: 15/956,826

(22) Filed: Apr. 19, 2018

(51) Int. Cl.
A01K 1/035 (2006.01)
A01K 1/062 (2006.01)
A01K 13/00 (2006.01)

(52) U.S. Cl.
CPC .......... *A01K 1/0353* (2013.01); *A01K 13/006* (2013.01)

(58) Field of Classification Search
CPC .. A01K 1/0353; A01K 27/001; A01K 27/002; A01K 1/062
See application file for complete search history.

(56) References Cited

U.S. PATENT DOCUMENTS

| | | | | |
|---|---|---|---|---|
| 3,902,456 A * | 9/1975 | David | ................ | A01K 1/0353 119/28.5 |
| 4,407,233 A * | 10/1983 | Bozzacco | ............ | A01K 27/006 119/858 |
| 4,606,078 A * | 8/1986 | Tkacsik | ................... | A41D 1/20 2/102 |
| 4,998,654 A * | 3/1991 | Bruzek | .............. | A41D 13/0012 2/102 |
| 5,136,981 A * | 8/1992 | Barreto, III | .......... | A01K 1/0353 119/28.5 |
| 5,588,393 A * | 12/1996 | Heilborn | .............. | A01K 1/0353 119/28.5 |
| 6,132,452 A * | 10/2000 | Pinter | ................... | A61H 39/00 607/1 |
| 6,143,946 A * | 11/2000 | Docter | ................ | A61F 13/0269 602/41 |
| 6,675,744 B1 * | 1/2004 | Levan | .................. | A01K 27/006 119/858 |
| 6,988,771 B1 * | 1/2006 | Huang | ................... | A47C 31/00 297/219.1 |
| D535,062 S * | 1/2007 | McGinley | .................... | D30/118 |
| 7,786,875 B2 | 8/2010 | Wu | | |
| 10,194,641 B1 * | 2/2019 | Benabud | .............. | A01K 27/002 |
| 2009/0056643 A1 * | 3/2009 | Hetzel | .................... | A01K 11/00 119/858 |
| 2013/0047935 A1 * | 2/2013 | Pieper | .................. | A01K 27/006 119/792 |
| 2018/0092800 A1 * | 4/2018 | Chapman | ............. | A61N 5/0613 |
| 2018/0126019 A1 * | 5/2018 | Prieto Andreu | ...... | A47L 23/266 |
| 2018/0161226 A1 * | 6/2018 | Von Behren | ........... | A61G 7/065 |

FOREIGN PATENT DOCUMENTS

GB      2473487 A * 3/2011 ............. A47C 31/00

* cited by examiner

*Primary Examiner* — Monica L Barlow
(74) *Attorney, Agent, or Firm* — Sanchelima & Associates, P.A.; Christian Sanchelima, Esq.; Jesus Sanchelima, Esq.

(57) ABSTRACT

The present invention provides a therapeutic unit to be used for a pet. The therapeutic unit includes one or more therapeutic crystals which provide calming effect for the pet, while also providing healing effect for the pet to mitigate various ailments. The therapeutic unit is implemented in the form of a therapeutic mat for the pet to rest thereon, or a therapeutic vest for the pet to wear for constant exposure to the therapeutic crystals. In the present therapeutic unit, the therapeutic crystals include one or more of an amethyst crystal, a pink rose quartz crystal and a black tourmaline.

12 Claims, 3 Drawing Sheets

THERAPEUTIC UNIT FOR PETS

BACKGROUND OF THE INVENTION

1. Field of the Invention

The present disclosure generally relates to a therapeutic unit for pet, and more particularly to a mat and/or a vest for a pet with therapeutic crystals to provide healing effect for the pet.

2. Description of the Related Art

It is well known that pets become anxious after coining to a new home or being alone. For example, when puppies are separated from their litter, or their birthmother, separation anxiety can become a major problem. The change in environment can put a lot of stress on a young pet. At bed time, such pets whine when they should be sleeping and keep everyone awake. Sometimes, pets, for example dogs, cats and other animals can even become hyperactive when moved from their natural open habitat to confined closed spaces of a home or the like. A common problem to pet dog owners is that, when the dogs are agitated or excited by some disturbance without their being around to control the dogs, the dog's continuous and loud barking quite often gets them into trouble with the neighbors. There is even a risk of such aggrieved pet attacking guests in the house, or sometimes even the children or owner of the house.

Efforts have been expended to develop solutions to help dogs overcome anxiety, restore calm and sleep peacefully. For example, U.S. Pat. No. 7,786,875 B2 discloses a soothing device which is a portable waterproof device that can be worn by a baby or a dog as well as positioned on the baby's cradle or the dog house. Audio sounds can be dynamically recorded and stored in the soothing device which is powered by a built-in replaceable battery. The recorded audio sounds are automatically played by the soothing device through a built-in speaker when the soothing device detects through a built-in audio sensor a sudden large noise from some external source or by the baby's crying or by the dog's barking so as to calm the baby or the dog down quickly and automatically.

Such soothing devices may be helpful to some extent, but would require a lot of hassle from the owner's point of view. These devices being electro-mechanical are generally delicate and may not be able to withstand rough handling by pets. Further, these kind of soothing devices need electric power to operate, and thus may require either a permanent electric connection or batteries which are to be replaced after every few months or a certain period of time. Such electric device may even pose risk of electric shock to the pets from exposed wires or the like. In addition, these devices do not provide any healing and/or pain-relief effect to the pet.

Accordingly, there is a need for some means which can help with calming the pets while provide healing effect. The various documents describing the closest subject matter provide for a number of more or less complicated features that fail to provide effective solution. None of these documents suggest the novel features of the present invention.

SUMMARY OF THE INVENTION

It is one of the main objectives of the present invention to provide a therapeutic unit for pets which aid and enhance certain behaviors in the animals when exposed thereto.

It is another objective of the present invention to provide a therapeutic unit in a suitable form factor, such as a mat so that the pet could easily be laid thereupon, or a vest so that the pet could wear the same for achieving constant exposure and effect.

It is still another objective of the present invention to provide a therapeutic unit which is easy and inexpensive to manufacture.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
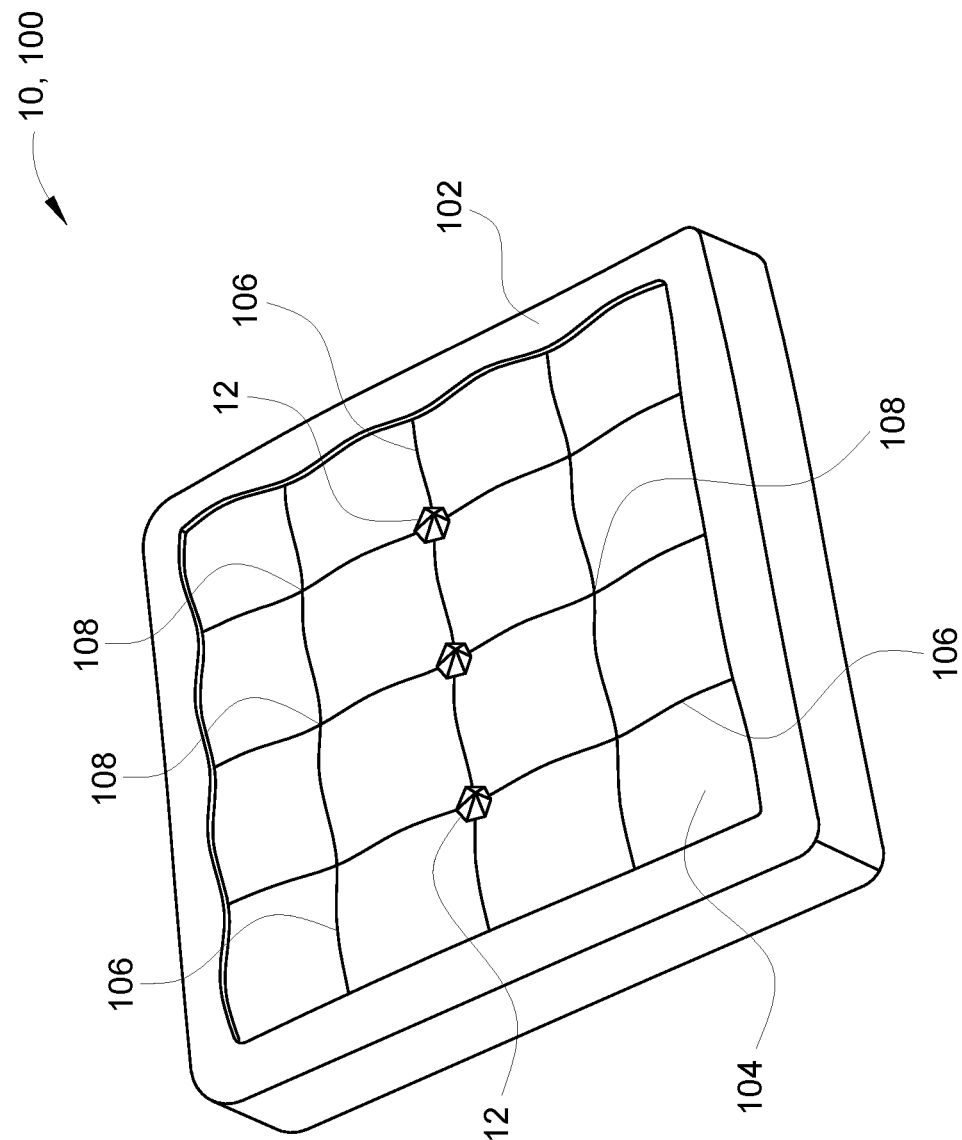
FIG. 1 illustrates a diagrammatic view of a therapeutic unit, in accordance with a first embodiment of the present disclosure.

FIG. 1 illustrates a therapeutic unit (referred by the numeral 10), in accordance with a first embodiment of the present disclosure. In this embodiment, the therapeutic unit 10 has been implemented as a mat (hereinafter referred to as "therapeutic mat" and referred to by the numeral 100). The therapeutic mat 100 embodying the teachings of the invention has a generally square shape; however, it may be contemplated that the therapeutic mat 100 may have any other suitable shape for allowing a pet to rest thereon without any limitations. For example, in other examples, the therapeutic mat 100 may be rectangular, circular, or elliptical in shape. It will be understood that the pillow-like therapeutic mat 100 described is for illustrative purposes and that any type of pet mattress, pillow, or bed construction may be employed in connection with the present disclosure. In one or more examples, the therapeutic mat 100 may generally have a dimensions of about 3 feet by 2 feet, but may be customized to adapt to pets of different sizes.

As illustrated in FIG. 1, the therapeutic mat 100 may include an outer frame 102 which forms the boundary region thereof. The outer frame 102 may generally define the shape of the therapeutic mat 100. Further, as illustrated, the therapeutic mat 100 has an upper surface 104 which is formed of a fabric layer. In one or more examples, the outer frame 102 may be disposed at a height above the upper surface 104 which makes the outer frame 102 to be used a head-rest by the pet resting thereon. For such purposes, the outer frame 102 may be made of soft materials, such as rubber or the like. As may be contemplated, the therapeutic mat 100 may also have a lower surface (not shown) which is also formed of a fabric layer. In one or more examples, the fabric layers may be a soft porous material, such as cotton or polyester fiber material, or related materials with premium velvet feel. The upper surface 104 and the lower surface are coupled to each other by stitching 106 in between the upper and lower fabric layers which form separate interior compartments in the therapeutic mat 100. As may be seen, generally at the locations where the stitching 106 crossed each other, depressions in the form of pockets 108 are formed in the upper surface 104.

According to an embodiment of the present disclosure, the therapeutic mat 100 includes one or more therapeutic crystals 12 provided therewith. In one example, as illustrated in FIG. 1, the therapeutic crystals 12 may be located in the pockets 108 formed in the upper surface 104 of the therapeutic mat 100. In the illustrated example, the therapeutic mat 100 is shown to include three number of therapeutic crystals 12. These three number of therapeutic crystals 12 have been exemplary shown to be fixed at three of the pockets 108 formed along a center stitch 106 in the therapeutic mat 100. It may be appreciated that the illustration positions of the therapeutic crystals 12 are exemplary only and shall not be construed as limiting to the present disclosure. In the present examples, the therapeutic crystals 12 may be permanently fixed with the fabric layer of the upper surface 104 by any known suitable means, such as, but not limited to, adhesives or the like. In some other examples, the therapeutic crystals 12 may be removably coupled with the upper surface of the therapeutic mat 100, for example, by using fastening rings or the like.

Figure 2:
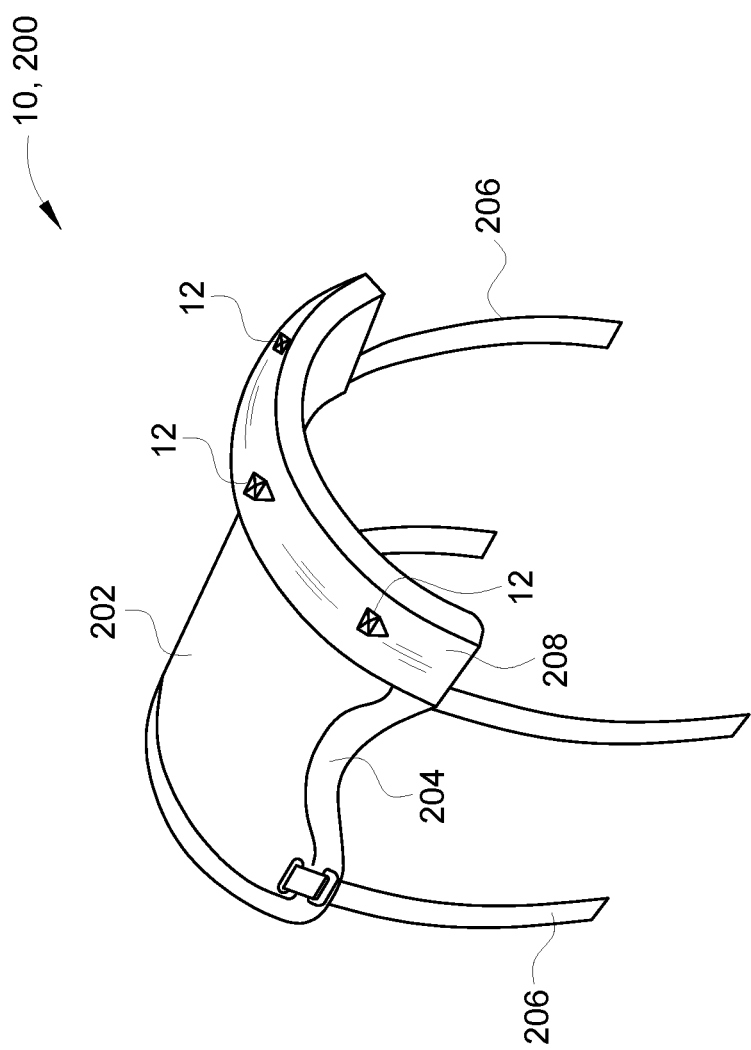
FIG. 2 illustrates a diagrammatic view of a therapeutic unit, in accordance with a second embodiment of the present disclosure.

FIG. 2 illustrates the therapeutic unit 10, in accordance with a second embodiment of the present disclosure. In this embodiment, the therapeutic unit 10 has been implemented as a vest (hereinafter referred to as "therapeutic vest" and referred to by the numeral 200). The therapeutic vest 200 may be adapted for mounting over a pet's back. In the illustrated example, the shown therapeutic vest 200 has been designed for mounting over a dog's body. The therapeutic vest 200 has relatively stiff but resilient foam body 202, and has a pair of side edges 204 which are concave and tapered. As may be seen, the pair of side edges 204 fold down beneath to close the therapeutic vest 200 around the dog's neck sides and wrap around the dog's chest. In one or more examples, the body 202 and the pair of side edges 204 are formed of soft porous material, such as cotton or polyester fiber material, or related materials with premium velvet feel. The therapeutic vest 200 further includes fasteners 206, such as Velcro fasteners to provide means for connecting lower ends of side edges together, in order to fixedly locate the therapeutic vest 200 for mounting over a pet's back.

In an embodiment, the therapeutic vest 200 includes a collar 208 formed at a front edge of the body 202. In some examples, the collar 208 may be curved and extending in length to ends of the side edges 204. In the present embodiment, the collar 208 may be in the form of a hollow transparent tube or the like. For example, the collar 208 may be made of transparent plastic, such as asymmetrical bi-oriented polypropylene which allows for sunlight and heat radiation to pass through thereof. The collar 208 may be permanently or removable attached to the body 202 of the therapeutic vest 200.

According to an embodiment of the present disclosure, the therapeutic vest 200 includes one or more therapeutic crystals 12 provided in the collar 208 therein. In one example, as illustrated in FIG. 2, the therapeutic crystals 12 may be located in the hollow inside of the collar 208. In the illustrated example, the therapeutic vest 200 is shown to include three number of therapeutic crystals 12 inside the collar 208. These three number of therapeutic crystals 12 have been exemplary shown to be symmetrically positioned along the length of the hollow tube of the collar 208. In the present examples, the therapeutic crystals 12 may be permanently fixed inside the collar 208 by any known suitable means, such as, but not limited to, adhesives or the like. In some examples, the collar 208 could be removed from the body 202 of the therapeutic vest 200 and opened to remove the therapeutic crystals 12 therefrom, if required.

In one or more examples, the therapeutic crystals 12 may be selected from the group consisting of: Agate; Alexandrite; Amazonite; Amber; Amethyst; Apatite; Aquamarine; Aventurine; Azurite; Azurite/Malachite; Black Obsidian; Calcite; Carnelian; Celestite; Chrysophase; hrysocolla; Citrine; Diamond; Emerald; Fire Agate; Flourite; Galena; Garnet; Hematite; Jade; Jasper; Kunzite; Lapis Lazuli; Lepidolite; Malachite; Moonstone; Onyz; Opal; Pearl; Peridot; Pytie; Quartz; Rhodochrosite; Rose Quartz; Ruby; Rutilated Quartz; Sapphire; Selenite; Smokey Quartz; Sodalite; Sugalite; Topaz; Tiger Eye; Tourmalated Quartz; Tourmaline; Turquoise and Variscite. In further examples, the therapeutic crystals 12 may be indicated to be a particulate material having a grain size of 0.001-0.003 inches, or non-particulate crystalline material can be used, as can particulate material of other grain size.

Certain natural stones, such as, inter alia, lava rock and steatite (also called soapstone) have the property that they accumulate heat very quickly and also release the heat again very gradually and uniformly, which makes them extremely suitable for healing and pain-relief effect. A further advantage of the use of natural stones is that they are not porous and are therefore not susceptible to the absorption of fluids, so that, inter alia, little or no perspiration will be absorbed in the bearing element. Yet an additional advantage of certain natural stones is that they release heat with wavelengths lying at the same level as the heat wavelengths of the human or animal body, so that said wavelengths pass more easily through the epidermis and penetrate more deeply and they are thus absorbed into the bloodstream. The heat provides, inter alia, alleviation of the pain of osteoarthritis, rheumatoid forms of arthritis etc., particularly by the fact that the heat causes drainage and elimination of toxins from the deep organs (joints, joint sockets, internal organs) by way of the lymphatic system, by means of perspiration.

In accordance with an embodiment of the present disclosure, the therapeutic crystals 12 include one or more of an amethyst crystal, a pink rose quartz crystal and a black tourmaline. Amethyst, for example, is a semi-precious stone which can be provided on the treatment surface of the therapeutic unit 10 to eliminate iron deficiencies and to give energy and warmth. Tourmaline is another known semi-precious stone material which can produce a slight electric current and acts upon the nerves, so it is best provided along the spinal column on the treatment surface. In the prior art, numerous therapeutic and healing uses of naturally-occurring crystals are found. Herein, in the therapeutic unit 10, the therapeutic crystals 12 are used to provide a multitude of healing therapeutic properties. For example, the amethyst crystal may be used to heal headaches, calm anxiety, reduce pain and swelling, block stress while regulating hormone production. The pink rose quartz crystal may be used to promote loving vibrations, relives earaches, emotionally heal, purify the heart, foster compassion, encourage inner healing, increase self-love and detox the body. The black tourmaline may be used to protect the body against stress and negativity, to energize while stimulating the immune system, and to help with relieving pain and arthritic swelling.

It may be understood that the therapeutic unit 10 of the present disclosure may include only one type of the said three therapeutic crystals 12, only two of the said three therapeutic crystals 12, or all three therapeutic crystals 12. Further, the therapeutic unit 10 may include more or less number of these three therapeutic crystals 12 in any combination without any limitations. In one example, the therapeutic unit 10 may be customized for different sexes of the pet. For instance, the present therapeutic unit 10 may include the amethyst crystal and the pink rose quartz crystal only when being implemented for a female pet; while the present therapeutic unit 10 may include the amethyst crystal and the black tourmaline when being implemented for a male pet.

Figure 3:
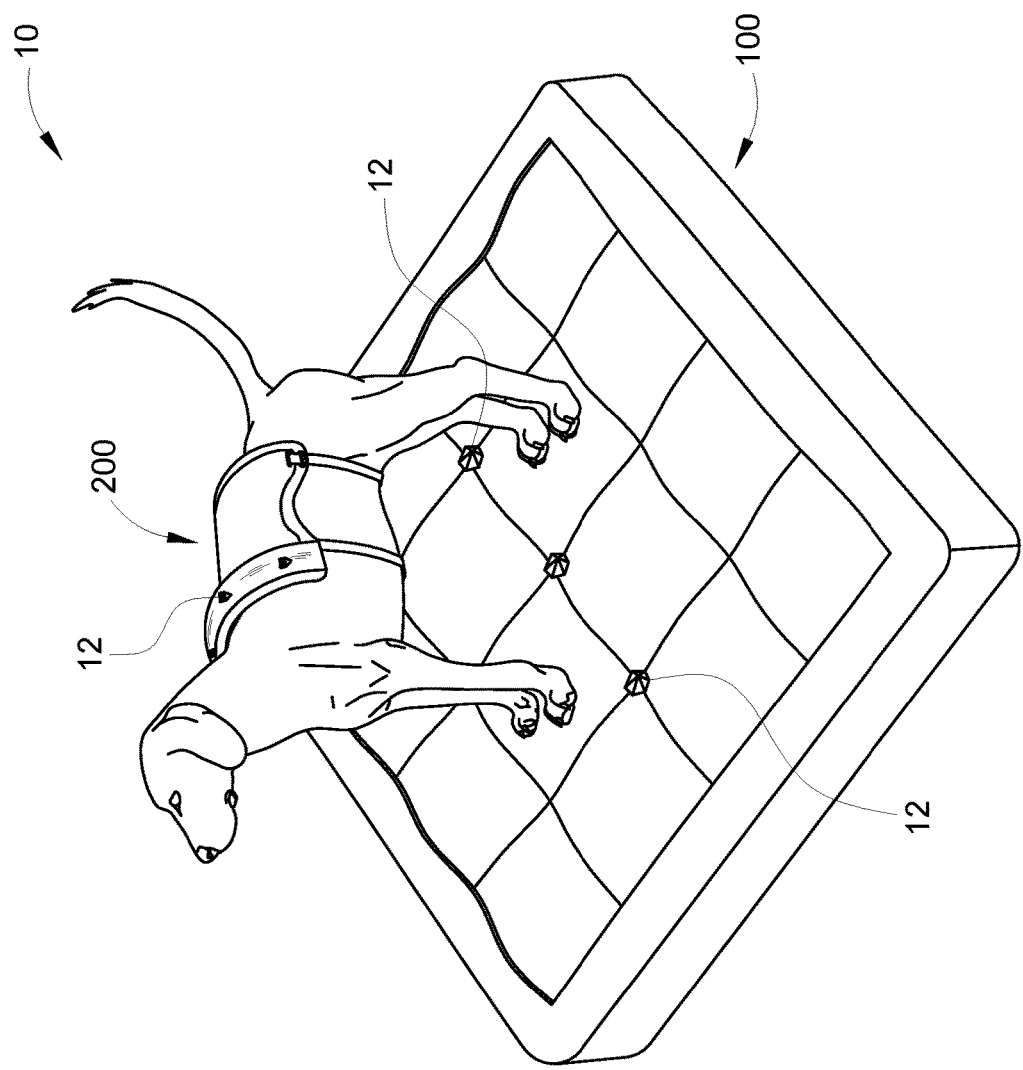
FIG. 3 illustrates a diagrammatic view of the therapeutic units of FIG. 1 and FIG. 2 being implemented with a pet, in accordance with one or more embodiments of the present disclosure.

FIG. 3 illustrates the therapeutic unit 10 in the form of the therapeutic mat 100 and the therapeutic vest 200 being utilized with a pet dog. In one or more embodiments, the therapeutic unit 10 may include the therapeutic mat 100 only, or the therapeutic vest 200 only, or a kit including both the therapeutic mat 100 and the therapeutic vest 200. As illustrated, when being implemented, the therapeutic units 10 expose the treatment surface containing the therapeutic crystals 12 to designated regions of the pet. In some examples, the therapeutic unit 10 is provided on the treatment surface in the zones provided for the parts of the body and/or the organs of the pet on which their respective therapeutic effect is greatest. The therapeutic units 10 may particularly be effective when used with exposure to sunlight, such as outdoors or near a window in the house. This provides the opportunity for the pet to play in the sunlight while the therapeutic units 10 may provide healing effect. In some examples, the therapeutic unit 10 can be made even more efficient by providing means for generating infrared radiation, such as, for example, at least one infrared radiation element, which is preferably directed towards the treatment surface. The infrared radiation heats not only the body of the pet for providing calming effect, but also the therapeutic crystals 12, so that the latter retain their properties longer.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a therapeutic unit for pets, comprising:
a pillow-like mat having an upper surface, a lower surface, and an outer frame, said upper surface coupled to said lower surface, at least one therapeutic crystal located on said upper surface; and
a pet vest, said pet vest includes a body having a front edge and a pair of side edges that are concave and tapered, said pair of side edge adapted to fold around a pet's necks sides and around said pet's chest, said pet vest includes fasteners on said pair of sides to lock said pet vest on said pet, said pet vest includes a collar formed at the front edge of said body, said collar comprises a hollow transparent tube attached to said vest, and said collar includes at least one therapeutic crystal located in said tube.

2. The system for a therapeutic unit for pets of claim 1 wherein said mat is a rectangle, circle, or elliptical.

3. The system for a therapeutic unit for pets of claim 1 wherein said outer frame is disposed at a height above said upper surface.

4. The system for a therapeutic unit for pets of claim 1 wherein said outer frame is made of a soft material.

5. The system for a therapeutic unit for pets of claim 1 wherein said upper surface is coupled to said lower surface using stitching.

6. The system for a therapeutic unit for pets of claim 1 wherein said upper surface includes depressions in the form of pockets.

7. The system for a therapeutic unit for pets of claim 6 wherein said pockets include three crystals mounted to three of said pockets.

8. The system for a therapeutic unit for pets of claim 1 wherein said pet vest is made of a soft material.

9. The system for a therapeutic unit for pets of claim 1 wherein said body is made of foam.

10. The system for a therapeutic unit for pets of claim 1 wherein said at least one therapeutic crystal is selected from a group consisting of: Agate; Alexandrite; Amazonite; Amber; Amethyst; Apatite; Aquamarine; Aventurine; Azurite; Azurite/Malachite; Black Obsidian; Calcite; Carnelian; Celestite; Chrysophase; hrysocolla; Citrine; Diamond; Emerald; Fire Agate; Flourite; Galena; Garnet; Hematite; Jade; Jasper; Kunzite; Lapis Lazuli; Lepidolite; Malachite; Moonstone; Onyz; Opal; Pearl; Peridot; Pytie; Quartz; Rhodochrosite; Rose Quartz; Ruby; Rutilated Quartz; Sapphire; Selenite; Smokey Quartz; Sodalite; Sugalite; Topaz; Tiger Eye; Tourmalated Quartz; Tourmaline; Turquoise; or Variscite.

11. The system for a therapeutic unit for pets of claim 1 wherein said at least one therapeutic crystal is lava rock or steatite.

12. The system for a therapeutic unit for pets of claim 1 wherein at least three therapeutic crystals are used consisting of amethyst crystal, a pink rose quartz crystal and a black tourmaline.

* * * * *